US005190620A

United States Patent [19]

Winter

[11] Patent Number: 5,190,620

[45] Date of Patent: Mar. 2, 1993

[54] METHOD OF USING A ROTATABLE DISC TO REMOVE HEAT SOFTENABLE SURFACE COVERINGS

[75] Inventor: Phillip M. Winter, Birchwood, Minn.

[73] Assignee: Minnesota Mining and Manufacturing Company, St. Paul, Minn.

[21] Appl. No.: 721,139

[22] Filed: Jun. 26, 1991

Related U.S. Application Data

[63] Continuation-in-part of Ser. No. 558,302, Jul. 26, 1990, abandoned.

[51] Int. Cl.[5] .............................................. B32B 35/00

[52] U.S. Cl. .................................. 156/344; 156/154; 156/584; 51/407; 81/488

[58] Field of Search ....................... 156/154, 344, 584; 51/298-300, 296, 293, 407; 15/59, 60, 65, 68; 81/466, 488; 7/100, 124, 170

[56] References Cited

U.S. PATENT DOCUMENTS

| | | | |
|---|---|---|---|
| B 576,859 | 2/1976 | Frank et al. . | |
| 2,581,567 | 1/1952 | Wiley | 51/407 |
| 2,676,160 | 4/1954 | Ochoa . | |
| 2,919,180 | 12/1959 | Smith et al. . | |
| 3,653,858 | 4/1972 | Field . | |
| 3,738,951 | 6/1973 | Middlebrook . | |
| 3,983,047 | 9/1976 | Vinson . | |
| 4,055,897 | 11/1977 | Brix | 51/358 X |
| 4,133,144 | 1/1979 | Early et al. . | |
| 4,150,955 | 4/1979 | Samuelson . | |
| 4,335,033 | 6/1982 | Handl . | |
| 4,836,858 | 6/1989 | Reinhart . | |
| 5,123,139 | 6/1992 | Leppert et al. | 51/358 X |

FOREIGN PATENT DOCUMENTS 3030351 3/1982 Fed. Rep. of Germany .

OTHER PUBLICATIONS

Japanese reference "Tracer B-1" by MKC.
Trade literature Astro Pneumatic Tool Company Eraser TM disc.

*Primary Examiner*—Jeff H. Aftergut
*Attorney, Agent, or Firm*—Gary L. Griswold; Walter N. Kirn; Jeffrey L. Wendt

[57] ABSTRACT

A soft elastomeric disc for removing polymeric compositions from an underlying substrate. The disc is useful for removing decorative decals, stripes, graphics, emblems, protective moldings, paint and adhesive.

26 Claims, 2 Drawing Sheets

METHOD OF USING A ROTATABLE DISC TO REMOVE HEAT SOFTENABLE SURFACE COVERINGS

REFERENCE TO RELATED APPLICATION

This is a continuation-in-part of USSN 07/558,302 filed July 26, 1990, now abandoned.

BACKGROUND OF THE INVENTION

1. Field of the Invention

This invention relates to the removal of adhered surface coverings from a substrate. In particular, the invention relates to a rotatable disc, apparatus containing the same, and method of removing such surface coverings without damage to the substrate to which they are adhered.

2. Description of the Prior Art

Various surface coverings such as decorative decals, stripes, graphics, emblems, and protective moldings are used extensively in a variety of applications. Such surface coverings are typically adhered with pressure-sensitive adhesives to painted and unpainted surfaces of automobiles, trucks, airplanes, and boats. The pressure sensitive adhesives typically are based on acrylic polymers or elastomers which may have been modified by the addition of tackifiers and stabilizers to enable the surface covering item to adhere to the surface by finger or roller pressure.

In the process of repairing and repainting portions of a painted surface to which the surface coverings are adhered, removal of the coverings may be necessary. Removal of relatively thin surface coverings such as decals and pinstripes is presently done by carefully cutting the covering from the painted surface with a hand- or tool-held razor blade. Typically, this cutting process leaves the adhesive and small fragments of the surface covering on the surface which must thereafter be removed by vigorously rubbing the residue with a cloth or sponge soaked with a suitable solvent. Furthermore, the use of a razor blade may damage the underlying surface paint.

Another removal procedure currently used by autobody shop workers employs a heat gun to very carefully heat the surface covering so that a thin object such as a fingernail may be inserted under a softened edge to start removal and thereafter pulling on the edge to remove the remainder of the surface covering. However, relatively thin decals and stripes often do not have high tensile strength and usually tear free from the unremoved portion, thereby requiring the removal procedure to be initiated again. This procedure has the disadvantages of potentially overheating and damaging the painted surface from which the surface covering is removed, and it is a very tedious task which is further limited by wear and breakage of the worker's fingernails.

Another existing problem occurs when emblems and protective side molding on an automobile or truck are peeled from a surface. Adhesive residue is often left on both the emblem or molding and the painted surface of the automobile. The adhesive residue then must be removed from both surfaces. Typically the adhesive residue is removed by vigorously rubbing the residue with a cloth or sponge soaked with a suitable solvent which is selected so that it will dissolve the adhesive residue but not harm the painted surface which bears it. While more aggressive solvents may facilitate faster removal of the adhesives, such solvents typically damage some painted surfaces and may have flammability and/or toxicity concerns. The adhesive residue on the emblem or the side molding must also be removed, usually by scraping, followed by solvent cleanup.

To date, there has not been an effective, quick, solvent-free method to remove emblems, graphics, and stripes from painted or unpainted surfaces. Furthermore, there has not been an effective, solvent-free method to remove adhesive residue or polymeric coatings from automobile, truck, boat, or airplane surfaces.

SUMMARY OF THE INVENTION

The present invention provides an apparatus, a rotatable body and a method which are useful for the effective, quick removal of heat softenable surface coverings. The apparatus removes surface coverings from a wide variety of substrates without harming the substrate. Furthermore, the apparatus greatly reduces the use of flammable and/or toxic solvents, and the body is essentially self cleaning.

The present invention is an apparatus for substantially removing adhered, heat softenable coverings from the surface of a heat stable substrate without damage to the substrate. The apparatus comprises a rotatable body having a peripheral surface and being rotatable about its axis, the body comprising at least one disc of an elastomer. The elastomer is selected so that the body is capable of increasing the temperature of the adhered heat softenable surface covering when the body is rotated in frictional contact therewith to a temperature which diminishes the integrity of the surface covering. The body forcibly removes the surface covering after the temperature increase, while also attriting a portion of the peripheral surface to which the surface covering contacted, thus providing a renewed peripheral surface of the elastomer. The apparatus also comprises a means to rotate the rotatable body about its axis at a surface speed sufficient to cause the increase in temperature.

The present invention also provides a method for removing adhered heat softenable surface coverings from a heat stable substrate. The rotatable body rotates at a speed which diminishes the integrity of the surface covering. The peripheral surface thereafter causes the heat softenable covering to be forcibly removed from the substrate surface. The portion of the peripheral surface which contacted the heat softenable surface covering thereafter attrites from the peripheral surface.

DETAILED DESCRIPTION OF THE INVENTION

The present invention provides discs for use with power tools for the removal of heat softenable surface coverings from a heat stable substrate without appreciable change to the substrate. The term "disc(s)" is meant to include wheels, fluted wheel structures or other structures with a substantially uninterrupted peripheral work surface. These discs comprise soft polymeric elastomeric matrixes which are a unitary disc structure or a disc structure formed by a plurality of thinner disc elements mounted on an arbor. The term "heat softenable material" is meant to denote a material that, when heated to a deforming temperature, softens to a point at which the material's integrity is diminished such that the material may be deformed when exposed to frictional forces. The term "heat stable" with reference to a substrate is meant to denote that such material will not deform under the same frictional forces that the heat softenable material deformed under, when subjected to a temperature which is equal to or less than the deforming temperature.

The discs of the invention are used with a power tool to effectively remove decorative decals, stripes, adhesive residue, or other heat softenable surface coverings from most painted or unpainted automotive, truck, airplane, or boat surfaces without appreciable change or damage to the surfaces. More specifically, when used on a heat stable painted surface, the paint is generally undamaged.

Heat softenable paint is often used to cover wooden articles such as furniture. The present invention may be used to remove heat softenable paint from wooden surfaces without damaging the underlying wood. This method is much quicker and less labor intensive than scraping or sanding the wood. This removal procedure can be performed with relative ease and less skill as compared with procedures currently used.

The discs of the invention have good mechanical strength and have a low, controlled wear rate during use. Wear or attrition of the peripheral surface of the discs provides a self-cleaning disc. The discs should be sufficiently stiff to impart mechanical energy to the item being removed but not so stiff so as to impart excessive energy to the heat stable substrate and cause damage to the substrate. The energy imparted to the surface by the rotating discs of the invention is partially converted into thermal energy which heats the surface, and, if excessive, the resultant heat can cause painted surfaces to craze, wrinkle, blister, or completely lose the paint. Furthermore, the thermal energy may deform the substrate if excessive temperatures are reached.

Figure 1:
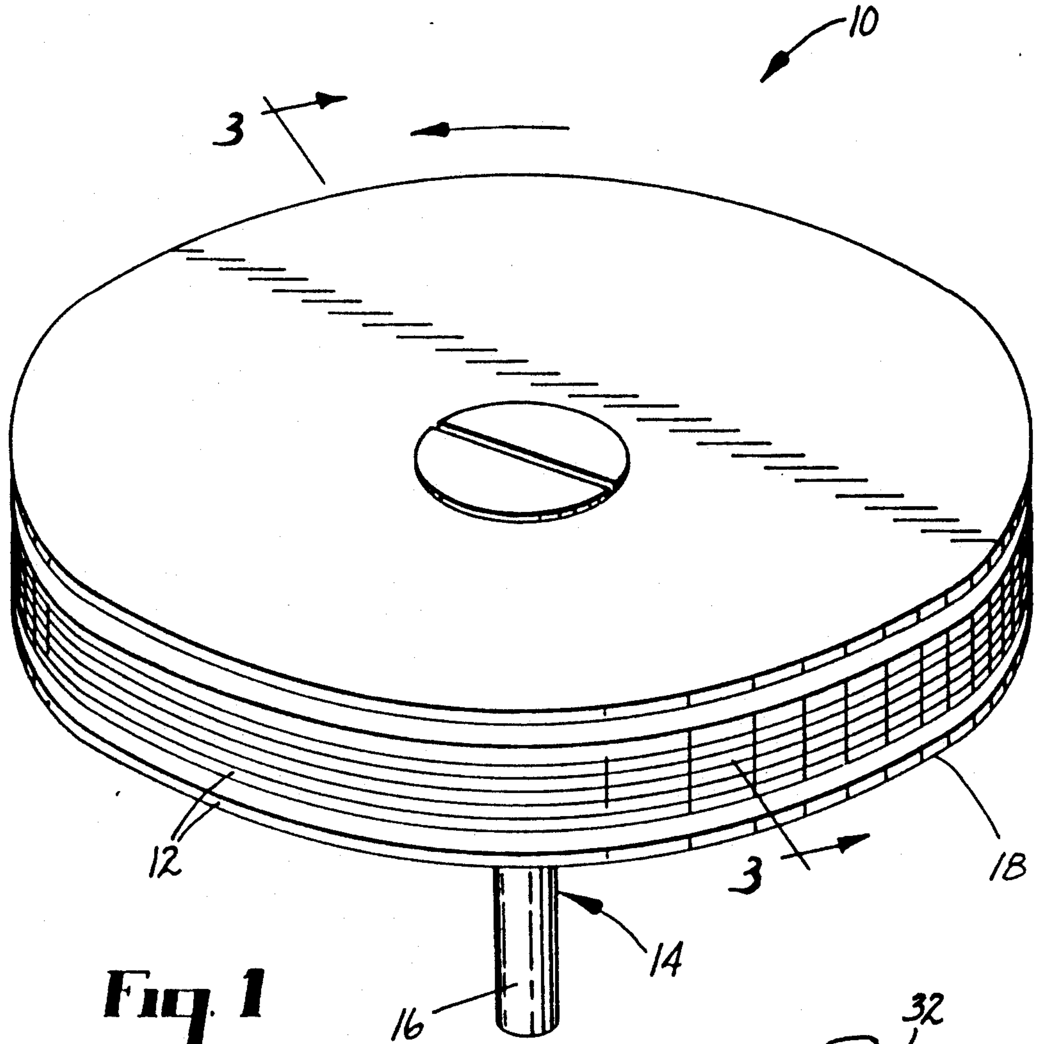
FIG. 1 is a perspective view of a plurality of elastomeric discs mounted on an arbor to provide one embodiment of an article of the present invention.
Figure 3:
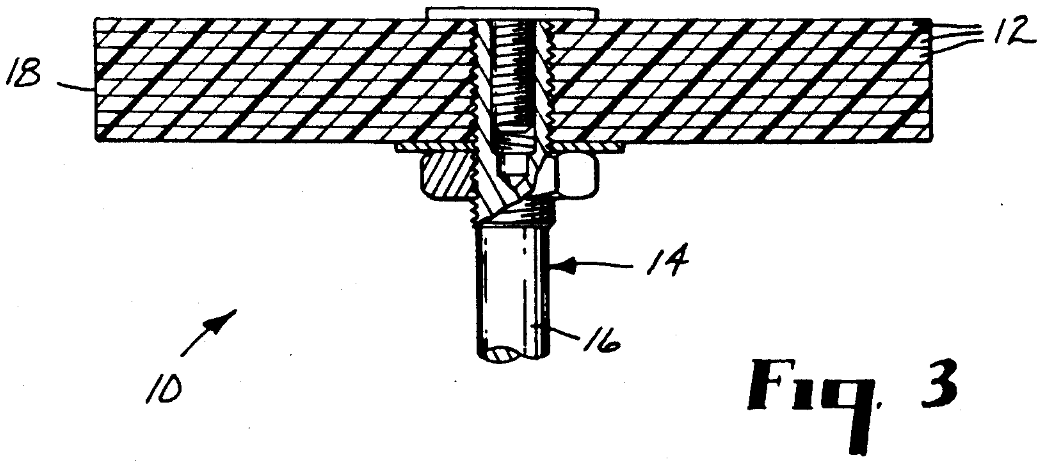
FIG. 3 is a sectional view taken at line 3—3 of the embodiment of FIG. 1.

Referring to Figs. 1 and 3, a composite disc 10 of the present invention is shown. Composite disc 10 is comprised of thinner individual discs 12. The composite disc 10 is mounted to an arbor 14. The arbor 14 is adapted such that end 16 may be coupled to a power tool capable of rotating the composite disc 10 at speeds of at least 300 surface meters per minute. Removal of a heat softenable material occurs by urging edge 18 against the material for a period of time sufficient to remove the material.

Figure 2:
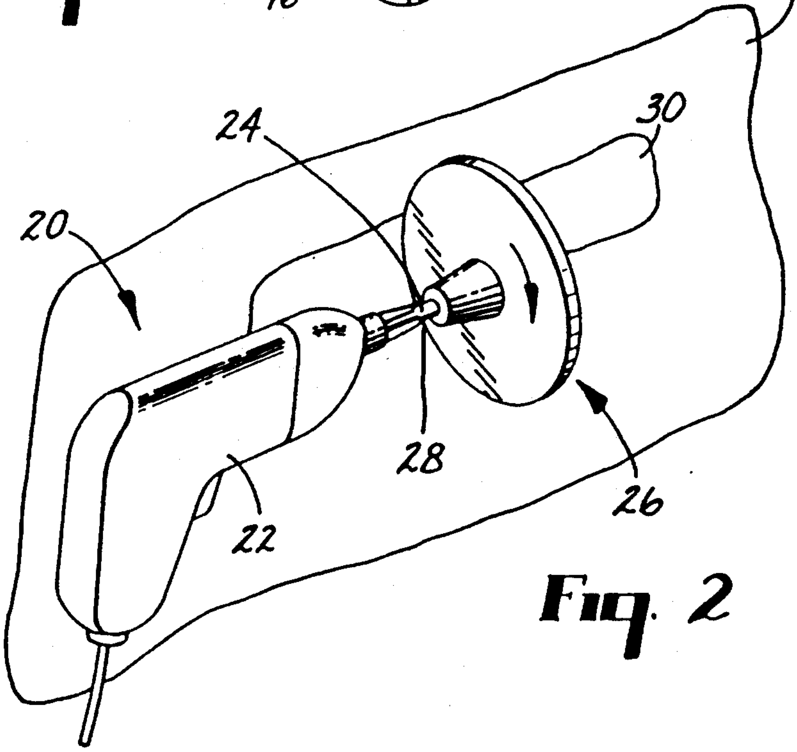
FIG. 2 is a perspective view of the apparatus of the present invention, in use, removing a heat softenable surface covering from a heat stable substrate.

Referring to FIG. 2, apparatus 20 of the present invention is shown removing a heat softenable material from a heat stable substrate. The apparatus 20 comprises a rotating means such as drill motor 22 coupled to an arbor 24, with a plurality of discs 26 secured to the arbor 24. The drill motor 22 rotates the discs 26 as a periphery 28 of the discs 26 contacts decal 30. The periphery 28 is urged against decal 30 causing the frictional contact to raise the temperature of decal 30 and the underlying adhesive which secures decal 30 to substrate 32. When the temperature reaches the deforming temperature of decal 30, a portion of the decal is removed from substrate 32, while at the same time a portion of the periphery is attrited from the discs 26. The attriting action results in a self-cleaning disc, free of any decal portions clung to its periphery. The drill motor 22 must have sufficient power to rotate the discs to a surface speed that results in the decal 30 achieving its deforming temperature.

Figure 4:
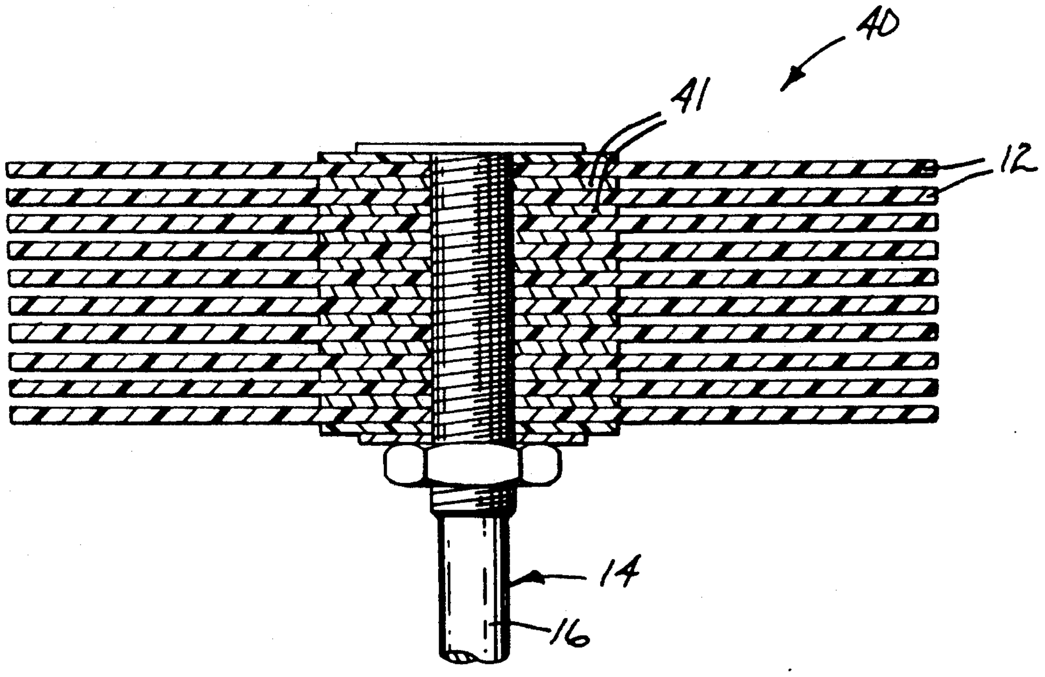
FIG. 4 is a sectional view of another embodiment according to the present invention which is similar to that of FIG. 1, but also includes spacers between elastomeric discs.

FIG. 4 shows a composite disc 40 which is similar to composite disc 10 shown in FIGS. 1 and 3 but it also includes spacers 41 between individual discs 12.

The soft polymeric elastomers used in the discs of the invention can be selected from a wide variety of materials including plasticized polyvinyl chloride (PVC), alkylenic block copolymer, styrenic block copolymer, thermoplastic polyester, thermoplastic polyurethane, crosslinked natural rubber, ethylene-propylene elastomer, nitrile rubber, styrene/butadiene rubber, ethylene-propylene terpolymer rubber, thermoplastic polypropylene/ ethylene-propylene copolymer blend, neoprene rubber, thermoplastic polyamide, copolymers thereof, and mixtures thereof. The preferred elastomer is plasticized polyvinyl chloride. Soft polymeric elastomers employed in the practice of this invention should preferably have glass transition temperatures of less than about −20° C.

Optionally, a plasticizer is added to the elastomer for the purpose of controlling mechanical properties such as hardness and improving forming processes. Suitable plasticizers include diisononyl phthalate, triisononyl-trimellitate, and other plasticizers commonly used with polyvinyl chloride. The preferred plasticizer is diisononyl phthalate and is added to the elastomer in the amount of about 40 to 55 weight percent.

The polymeric materials used to make the discs of the invention preferably have a foam structure with a density slightly less than the solid unfoamed polymer. It has been found that foamed elastomers typically are less likely to cause damage to a painted surface while differentially removing heat softenable surface coverings. However, very low density foamed polymeric elastomers may not be sufficiently stiff to impart adequate energy to remove the decals and adhesive residue. As the polymeric material becomes somewhat stiffer, the potential for being too aggressive can be partially offset by using foamed polymeric materials having lower densities. Preferably the polymeric material should have a Shore A hardness from about 10 to 90. Materials softer than about Shore 10 A are not economically effective in removing decals and adhesive residues due to the disc attriting so quickly. Discs harder than about Shore 90 A tend to damage painted surfaces while removing decals and adhesive residue. However, these discs could be used when removing graphics, decals, or adhesive from unpainted surfaces or when there is little concern for the integrity of the paint underlay. Additionally, the polymeric material should preferably not contain particulate materials which are sufficiently hard to cause scratching of surfaces such as paint.

The polymeric elastomer employed is formed into discs having a thickness preferably of about 1 mm to 7 mm. Preferably, a plurality of discs, with each disc having a thickness of about 1–2 mm are placed and secured on an arbor so as to make a wheel of the thickness suited to the need of the application and the power of the drive tool. There are some materials which allow discs thicker than 7 mm to function within the required limits for satisfactory selective removal performances.

A preferred embodiment of the invention employs a plurality of discs, each about 1–2 mm thick, mounted on an arbor. When using multiple polymeric elastomer discs having a total additive thickness of from about 15 to 100 mm or greater, it has been found that resultant wheel has significantly enhanced performance if a thin, rigid, spacer discs is placed in a uniform distribution between adjacent, or every other, or every third disc. Wheels having spacers as just described run smoother, run significantly cooler, have significantly reduced wear rates and perform removal of decals and adhesive residues at least as fast comparable wheels without spacers. The spacer disc typically have the same center hole size same as the elastomeric discs so as to match the arbor diameter, and have outside diameters to generate an annulus at least about 10 mm wide, and somewhat wider as the diameter of the elastomeric disc increases. Preferably, the outside diameter of the spacer disc should be less than about one-half the outside diameter of the elastomeric disc. The spacer discs preferably are at least about 1 mm thick and formed from relatively rigid materials that are not appreciably deformed by compressive forces employed to secure the elastomeric discs and spacer discs on the arbor. Examples of materials of construction for the spacer discs include metal such as steel or aluminum, plastics such as unplasticized polyethylene, polypropylene, nylon, polyvinyl chloride, acrylic, polycarbonate, and cardboard.

The disc of the invention is mounted on an arbor of a rotary power tool, which may be a portable hand-held air tool, an electrically powered tool, a stationary rotating shaft, or a rotating shaft supported by a robot arm. The discs should be mounted to a tool capable of rotating at least 300 surface meters per minute. The discs of the invention are ordinarily rotated at about 450 to 1550 surface meters per minute. Discs having a larger diameter can be rotated at somewhat higher surface speeds than smaller discs to achieve optimum performance. It is postulated the periphery of larger discs accumulate less thermal energy as there is more time to dissipate some thermal energy before energy is added by re-engagement with the work surface.

The discs of the invention should have adequate mechanical strength to resist fracture when rotated at speeds greater than about 1550 surface meters per minute, preferably greater than about 1825. Inadequate mechanical strength would limit the speed at which the discs could be rotated, which would increase the time required to remove decals or adhesive residue. Further problems encountered with discs having inadequate resistance to fracture include safety hazards such as stray pieces of the discs fracturing off and hitting the user's body.

While removing heat softenable surface coverings, the discs of the invention must slowly wear away to regenerate a disc surface which is substantially free of surface covering residue being removed. The wearing away or attrition of portions of the peripheral surface act in a way to self clean the discs. If the disc is too wear resistant, adhesive residues accumulate on the working surface, resulting in a slower removal of surface coverings. The accumulated adhesive residue on the periphery of the disc may also smear adhesive residue back onto the surface from which it was removed and be very difficult to remove by methods such as wiping with a solvent soaked cloth. It has been found that discs having a wear rate greater than about 0.1 gram per minute per 7 mm length when removing the pressure sensitive adhesive attachment tape (as described in the examples below) are self-cleaning and thus continue to effectively remove adhesive residue. (The 7 mm length describes the width of the peripheral surface.) On the other hand, discs with very high wear rates, e.g., greater than about 11 grams per minute per 7 mm length, tend to be less economical.

As previously mentioned, if excessive thermal energy is generated by the discs of the invention while attempting to selectively remove surface coverings, the underlying and adjacent paint coatings may be damaged. It has been found that discs which generate a maximum temperature of less than about 160° C., when evaluated according to the "Peak Temperature Test" (described in the examples below), will ordinarily not damage most cured automotive paint coatings. A minimum temperature of about 70° C. is generally required due to lower temperatures taking too long for removal and/or not heating some materials sufficient for removal.

The following examples are illustrative of the invention and parts and percentages are by weight unless specified otherwise.

EXAMPLES 1-5, CONTROL A

Plasticized polyvinyl chloride extrudable mixtures were prepared by mixing from 30 to 120 parts (as shown in Table 1) of diisononyl phthalate plasticizer, with 100 parts medium high molecular weight polyvinyl chloride powdered resin, commercially available from Occidental Chemical Corporation under the commercial designation "Oxy 250", 2.4 parts heat stabilizer, commercially available under the commercial designation "Ferro 130" from Ferro Corporation, Bedford, Ohio, 2.4 parts stabilizer, commercially available under the commercial designation "Ferro 5221" from Ferro Chemical, 4.8 parts epoxidized soybean oil stabilizer/-plasticizer, formerly commercially available under the designation "Admex 710" from Archer Daniels Midland Company and now commercially available as "Drapex" 6.8 from the Argus Division of Whitco Corporation, and 0.5% blowing agent based on the total weight of the mixture, commercially available as "Kempore 200MC" from Uniroyal Chemical Company, Inc. This mixture was blended together in a Papenmeirer Model 4930 Petmold high intensity mixer to produce a dry, free-flowing powder mixture. A 1.01 mm thick, 100 mm wide film was melt extruded using the powder mixture from an extruder fitted with a 100 mm wide film die that was maintained at a temperature range of 180°-195° C. The molten film was passed between two mm diameter steel rolls spaced about 1.01 mm apart, and then immediately immersed into a cooling water bath. The solidified film weighed about 1000 g/m$^2$, had a specific gravity of 1.0 (equivalent to 80% theoretical) and a Shore A durometer of 62. Control A has a Shore A durometer value of 95, which exceeds the preferred hardness of Shore 90 A.

EXAMPLES 6-9

In Examples 6-9, the composition was similar to that of Example 2 except that the amount of blowing agent was varied. The amount of blowing agent and Shore A durometer values are given in Table 1.

TABLE 1

| EXAMPLE | PARTS PLASTICIZER | PARTS BLOWING AGENT | SHORE A DUROMETER VALUE |
|---|---|---|---|
| Control A | 30 | 0.70 | 95 |
| 1 | 40 | 0.75 | 75 |
| 2 | 60 | 0.85 | 71 |
| 3 | 80 | 0.95 | 66 |
| 4 | 100 | 1.05 | 62 |
| 5 | 120 | 1.15 | 53 |
| 6 | 60 | 0.00 | 65 |
| 7 | 60 | 0.51 | 70 |
| 8 | 60 | 1.02 | 60 |
| 9 | 60 | 1.53 | 55 |

EXAMPLES 10-14, CONTROL B

In Examples 10–14, a polypropylene/ethylene-propylene copolymer blend, which is commercially available from Monsanto Chemical Company under the tradename "Santoprene," was melt extruded from a die heated at 230° C. to form about 1.01 mm thick films, with the exception that Examples 11 and 14 were about 2.02 mm thick. "Santoprene" copolymer blend grade 201-55 having a Shore 55 A durometer was employed in Examples 10 and 11, grade 201-73 with a Shore A durometer 70 in Example 12, grade 201-87 with a Shore A durometer 85 in Examples 13 and 14, and grade 203-50 having a Shore A durometer greater than 90 (about Shore 50 D) in Control Example B. (Control B exceeds the preferred hardness of Shore 10-90 A). It was noted that the "Santoprene" polymers contained small amounts of an unidentified particulate material.

EXAMPLE 15

A styrene-ethylene/butylene-styrene block copolymer thermoplastic elastomer commercially available from Shell Chemical Company under the trade designation "Krayton G1652," and USP mineral oil, commercially available from Penreco, Karns City, Penna., under the trade designation "Drakeol 34" were mixed together in a ratio of 3 parts polymer and 1 part mineral oil, using a low speed cage mixer. The mixture was then extruded as described in Example 1 into a film about 0.90 mm thick. The resultant film had a Shore A durometer value of 61.

EXAMPLE 16, CONTROL C

Thermoplastic polyurethanes, commercially available from B. F. Goodrich Company under the tradename "Estane," were extruded at about 220° C., as described in Example 1, into film about 0.90 mm thick. In Example 16, "Estane 58206" polyurethane was used having a Shore A durometer value of 85, and in Control C, "Estane 58409" polyurethane was used, having a Shore durometer of 48 D (greater than 90 A), respectively. (Control C exceeds the preferred hardness of Shore 10-90 A.)

EXAMPLE 17, CONTROL D

Thermoplastic polyester, commercially available from E. I. duPont Company, Elastomers Division, under the tradename "Hytrel," was extruded at about 220° C., as described in Example 1, into film about 0.90 mm thick. In Example 17, "Hytrel 4056" was used having a Shore durometer of 88A, and in Example Control D "Hytrel 5526" was used having a Shore durometer of 55 D (greater than 90 A). (Control D exceeds the preferred hardness of Shore 10-90 A.)

The following Table 2 is a summary giving the construction materials of Examples 10–17 and Controls B, C, and D.

TABLE 2

| Example | Polymer Type | Trade Name | Shore A Hardness | Thickness, mm |
|---|---|---|---|---|
| 10 | Polypropylene/ ethylene- proplylene copolymer blend | Santoprene 201-55 | 55 | 1.01 |
| 11 | Polypropylene/ ethylene- propylene copolymer blend | Santoprene 201-55 | 55 | 2.02 |
| 12 | Polypropylene/ ethylene- proplylene copolymer blend | Santoprene 201-73 | 70 | 1.01 |
| 13 | Polypropylene/ ethylene- propylene copolymer blend | Santoprene 201-73 | 70 | 2.02 |
| 14 | Polypropylene/ ethylene- propylene copolymer blend | Santoprene 201-87 | 85 | 1.01 |
| Control B | Polypropylene/ ethylene- propylene copolymer blend | Santoprene 203-50 | >90 (~50D) | 1.01 |
| 15 | Styrene- ethylene/ butylene- styrene block copolymer- mineral oil blend (3:1 ratio) | Kraton G 1652 | 61 | 0.90 |
| 16 | Polyurethane | Estane 58206 | 85 | 0.90 |
| Control C | " | Estane 58409 | >90 (48D) | 0.90 |
| 17 | Polyester | Hytrel 4056 | 88 | 0.90 |
| Control D | " | Hytrel 5526 | >90 (55D) | 0.90 |

EXAMPLES 18-20, CONTROLS E-F

Preformed commercially available foam materials about 7 mm thick were used in these examples. These foam materials were obtained from Rubatex Corporation, P.O. Box 340, Bedford, Vir. 24523-0340. Discs 75 mm in diameter were cut from sheets of these preformed foam rubber materials. Table 3 below provides some information on these foam materials. In addition, a preformed fluorinated elastomer sheet about 2.10 mm thick, available from the assignee under the trade designation "Fluorel 2176," was tested and its properties are given in Table 3 below.

TABLE 3

| Example | Foam Description | Shore A Hardness | Density $Kg/m^3$ |
|---|---|---|---|
| 18 | Nitrile R-437-H | 12 | 160–352 |
| 19 | Neoprene R-431-N | 28 | 288–448 |
| 20 | SBR R-8407-S | 34 | 160–320 |
| Control E | Neoprene R-411-N | 4 | 160-256 |
| Control F | Fluorel 2176 | 71 | 1800 |

PRODUCT EVALUATIONS

The products of the above examples were evaluated in the Peak Temperature Test, Performance Test and the Paint Damage Test according to the procedures given below.

PEAK TEMPERATURE TEST

This test measured the maximum temperature of a surface after that surface has been buffed with discs of the test product. The individual discs were in the form of a thin sheet, e.g., 0.75 to 1.30 mm. A sufficient number of 75 mm diameter discs with a 7 mm center hole were cut from the test product and mounted on a 7 mm diameter mandrel supported by 25.4 mm diameter flanges to form a composite layered structure approximately 7 mm thick. When the test product was about 1 mm thick, about 8 discs were placed on the mandrel. The mandrel, with discs attached, was mounted into the collet of an air powered rotary tool (ARO Model 80G7EI). With the aid of a fixturing attachment, an aluminum test panel 50 mm by 280 mm by 0.80 mm thick was secured to a triple beam balance having a capacity of greater than 1 kg. The test panel was supported on the top by five flat-headed capscrews about 5 mm from the surface of the supporting fixture. An iron-constantan thermocouple was supported against the center of the backside of the test panel with a nonmetallic plastic leaf spring. The thermocouple was held against the backside of the test panel approximately 2 cm from the point where the center capscrew supported the test panel. A direct reading Simpson Model 383 Temperature Tester was attached to the leads from the thermocouple. After taring the balance to zero, the test disc, rotating at 3100+/−100 RPM as measured with a reflected light tachometer, was urged against the portion of the test panel directly opposite the thermocouple for 60 seconds with a force of 1000 grams. The Peak Temperature was then observed and recorded. A Peak Temperature of less than about 160° is preferred.

PERFORMANCE TEST

This test procedure evaluated the ability of test discs to remove attachment tapes of the type used to secure emblems and protective strips to painted automobile body surfaces and also evaluated a suitable wear rate of the test disc as well as damage to the painted surface under and near where the attachment tape was adhered. The test procedure was repeated using a material which simulates decals adhered to a painted surface (such as a truck trailer or an airplane exterior surface) to further evaluate the discs of the invention.

A 2.5 mm thick steel panel was painted with an automotive primer, coated with a black acrylic enamel and a clear topcoat enamel similar to that employed in auto-body shops to refinish an automobile surface. The painted panel was allowed to dry at room temperature for 30 or more days before being used in this test. A 25 by 75 mm piece of a pressure sensitive adhesive tape, commercially available from 3M Company under the tradename Scotch-Mount Super Automotive Attachment Tape, was applied with moderate pressure to the painted panel. To simulate aging, the panel was then placed in an oven at 65° C. for 30 minutes. After the panel had cooled to room temperature, a 75 by 75 mm piece of pressure sensitive adhesive tape, commercially available from 3M Company under the tradename Scotchcal Brand Film No. 3690, was adhered to the surface by pressing the piece in place using a plastic applicator commonly employed for this purpose.

A composite layered disc comprising seven individual discs about 1.01 mm thick was placed on a mandrel. The mandrel with discs attached was mounted into the collet of an in-line air-powered rotary tool (ARO Model 80G7EI) which was then operated at 3100+/−100 RPM during the test. The tool and rotating test disc were then urged with a force of about 500 grams against the test panel over the edge of the test tape so that the test disc rotated into the edge of the attachment tape, gradually causing the Scotch-Mount Super Automotive attachment to be removed from the painted panel. The time required to remove the automotive attachment tape piece was noted and recorded as Removal Time. The disc weight loss was determined by weighing the test disc before and after this test and recorded as Wheel Weight Loss. Residue from the test disc and adhesive residue from the automotive attachment tape was removed. Wear Rate was calculated by dividing disc weight loss by removal time and reported as grams/minute. The preferred wear rate is at least about 1.0 grams/minute per 7 mm length.

The test procedure was repeated using a fresh, unused test disc to remove the previously applied 75 by 75 mm piece Scotchcal Brand Film 3690 adhered to the painted steel panel. Again, during removal of the Scotchcal film test piece, the Removal Time, Disc Weight Loss, and Wear Rate were recorded.

PAINT DAMAGE TESTS

To evaluate potential damage to a painted surface similar to the factory finish of an automobile, the test disc described above was set at a rotating speed of 3100 +/−100 RPM. The disc was urged against a small area on the test panel for 60 seconds with a force of about 1000 grams. The painted test panel was obtained from Advance Coating Technologies, Inc., 273 Industrial Drive, Hillsdale, Mich. 49242-0735, under the designation C168 C20 DIW. The panel was unpolished With a primer coated on a steel panel with a black color coat and a clear overcoat coated respectively over the primer. The painted surface was very carefully examined to note any scratching or damage to the glossy painted surface and reported as Paint Damage. It is preferred to not damage the painted surface underlay, however, materials which scratch a paint underlay may be used in applications where there is little concern for the finish of the paint.

Table 4 presents data and analysis from the Performance Tests using Scotch-Mount Super Automotive Attachment Tape test piece and also reports the results of the Peak Temperature Test.

Table 5 presents data and analysis from the Performance Tests using the Scotchcal Film 3690 test piece and also reports the results from the Paint Damage Test.

TABLE 4

| Example | Removal Time, s | Wheel Weight Loss, g | Wear Rate g/min* | Peak Temp. °C. |
|---|---|---|---|---|
| Cntrl A | 20.5 | 2.2 | 6.4 | 139 |
| 1 | 23.8 | 4.3 | 10.8 | 132 |
| 2 | 26.5 | 2.8 | 6.5 | 122 |
| 3 | 15.7 | 0.3 | 1.1 | 106 |
| 4 | 17.2 | 0.2 | 0.7 | 103 |
| 5 | 17.1 | 0.8 | 2.8 | 106 |
| 6 | 25.1 | 3.0 | 7.2 | 126 |

TABLE 4-continued

| Example | Removal Time, s | Wheel Weight Loss, g | Wear Rate g/min* | Peak Temp. °C. |
|---|---|---|---|---|
| 7 | 21.8 | 2.7 | 7.4 | 103 |
| 8 | 15.6 | 0.7 | 5.4 | 109 |
| 9 | 15.0 | 2.4 | 9.6 | 126 |
| 10 | 20.1 | 1.0 | 3.0 | 100 |
| 11 | 22.4 | 3.2 | 8.6 | 146 |
| 12 | 13.4 | 0.5 | 2.2 | 122 |
| 13 | 14.9 | 0.8 | 3.2 | 152 |
| 14 | 21.3 | 1.6 | 4.5 | 133 |
| Cntrl B | 19.7 | 1.5 | 4.6 | 136 |
| 15 | 16.2 | 0.8 | 3.0 | 116 |
| 16 | 24.1 | 1.3 | 3.2 | 125 |
| Cntrl C | 17.0 | 2.1 | 7.4 | 159 |
| 17 | 21.3 | 2.2 | 6.2 | 145 |
| Cntrl D | 27.0 | 1.3 | 2.9 | 123 |
| 18 | 50.0 | 0.7 | 0.8 | 84 |
| 19 | 46.5 | 1.5 | 1.9 | 87 |
| 20 | 18.4 | 2.8 | 9.1 | 96 |
| Cntrl E | Too soft to remove attachment tape | | | |
| Cntrl F | 15.9 | 0.0 | 0.0 | >200 |

*Per 7 mm width

TABLE 5

| Example | Removal Time. s | Wheel Weight Loss, g | Wear Rate g/min | Paint Damage |
|---|---|---|---|---|
| Cntrl A | 26.0 | 3.0 | 6.9 | Y |
| 1 | 24.2 | 3.0 | 7.4 | N |
| 2 | 23.0 | 1.8 | 4.7 | N |
| 3 | 27.2 | 0.4 | 0.9 | N |
| 4 | 41.4 | 0.2 | 0.3 | N |
| 5 | 29.6 | 0.8 | 1.6 | N |
| 6 | 35.5 | 2.5 | 4.2 | N |
| 7 | 23.2 | 1.4 | 3.6 | N |
| 8 | 29.9 | 0.8 | 1.6 | N |
| 9 | 22.7 | 2.3 | 6.1 | N |
| 10 | 28.7 | 0.6 | 1.3 | N* |
| 11 | 14.7 | 1.7 | 6.9 | N* |
| 12 | 26.7 | 0.4 | 0.9 | N* |
| 13 | 23.4 | 0.8 | 2.1 | N* |
| 14 | 29.3 | 1.5 | 3.1 | N* |
| Cntrl B | 22.4 | 1.8 | 4.8 | Y |
| 15 | 34.5 | 0.7 | 1.2 | N |
| 16 | 42.0 | 1.8 | 2.6 | N |
| Cntrl C | 34.4 | 3.9 | 6.8 | Y |
| 17 | 21.3 | 2.3 | 6.2 | N |
| Cntrl D | 47.1 | 1.6 | 2.0 | Y |
| 18 | 59.0 | 0.3 | 0.3 | N |
| 19 | 34.9 | 0.6 | 1.9 | N |
| 20 | 16.8 | 1.2 | 4.2 | N |
| Cntrl E | Too soft to remove Scotchcal material | | | |
| Cntrl F | 30.4 | 0.0 | 0.0 | Y |

*Very fine scratching from the particulate material in the Santoprene polymer.

Table 4 illustrates that Controls E and F do not have sufficient Wear Rates or Peak Temperatures. Control E is too soft to remove the attachment tape, and Control F does not wear away at a rate which allows the disc to renew its peripheral surface.

Table 5 illustrates that Controls A, B, C, D and F cause damage to the painted surface underlay. The examples according to the invention do not damage the painted surface underlay.

EXAMPLES 21 AND 22

A plasticized polyvinyl chloride extruded film about 1 mm thick was prepared by the method described in Example 1 using the composition described hereafter. Extrudable pellets composed of 100 parts OXY TM 410, an ultra high molecular weight polyvinyl chloride resin commercially available from Occidental Chemical Corporation, 95 parts triisononyl trimellitate plasticizer, 5 parts Therm-Chek TM 130 heat stabilizer, 1 part Therm-Chek TM 5221 stabilizer, 6 parts Drapex TM 6.8 stabilizer/plasticizer commercially available from the Argus Division of Witco Corporation, and 0.5 part Emersol TM 132NF powder lubricant, a powdered stearic acid commercially available from Henkel Corporation Emery Group, were tumbled with a 0.83 part diisononyl phthalate plasticizer and 0.83 part Kempore TM 200MC blowing agent commercially available from Uniroyal Chemical Company, Inc.

The resultant extruded sheet was cut into about 150 mm diameter 1 mm thick discs each having a 15 mm center hole. Sixteen discs and fifteen 1 mm thick cardboard (like that found at the back of a writing tablet) spacer discs (50 mm O.D.×15 mm I.D.) were interleaved 1 to 1 on a 15 mm diameter arbor. The elastomeric discs and spacer discs were secured by axial compression between two 1.5 mm thick polycarbonate washers (50 mm O.D.×15 mm I.D.) within 40 mm I.D. steel flat washers. A similar wheel (Example 22) was made without spacer discs and mounted on another 15 mm arbor.

The performance of wheels of Examples 21 and 22 were evaluated by the test procedure previously described where Scotch-Mount Automotive Super Attachment Tape was removed from a painted surface with the exception that (1) the air powered tool was replaced by flexible shaft operating at 1840 RPM which driven by 2600 watt electric motor and (2) the Scotch-Mount Super Automotive Attachment Tape to be removed was 50 by 150 mm. Results were as follows:

| Example | Wear Rate (2/min) | Removal Time (sec.) |
|---|---|---|
| 21 | 6.2 | 16 |
| 22 | 14.8 | 19 |

It is seen that the addition of spacer disc interleaved between the discs significantly enhances performance by reducing the wear rate and the time to remove the attachment tape.

As will be apparent to those skilled in the art, various other modifications can be carried out from the above disclosure without departing from the spirit and scope of the invention.

I claim:

1. A method of removing adhered heat softenable surface coverings from a surface of a heat stable substrate substantially without damage to said substrate, and method comprising the steps of:

(a) providing a rotatable body having a peripheral surface and being rotatable about its axis, said body comprising a disc of foamed elastomer, said elastomer being selected so that said body is capable of (1) increasing a temperature of said heat softenable surface covering when said body is rotated in frictional contact therein to a temperature which diminishes the integrity of said surface covering (2) forcibly removing said surface covering from said substrate after said increase in temperature, and (3) attriting a portion of said peripheral surface which contacted said surface covering to provide a renewed peripheral surface of said foamed elastomer;

(b) attaching said rotatable body to means for rotating said body and rotating said rotatable body to provide a rotating body which rotates about its axis at a surface speed which will cause said surface covering to increase in temperature when contacted by peripheral surface of said rotating body to a temperature which results in diminished integrity of said surface covering;

(c) contacting a portion of said peripheral surface of said rotating body with said heat softenable surface covering to be removed, causing said surface covering to increase in temperature and thereafter forcibly removing said surface covering by said portion of said peripheral surface from said heat stable substrate; and (d) continue rotating said rotating body to cause attrition of said peripheral surface of said rotating body.

2. The method of claim 1 wherein said surface speed is at least 300 surface meters per minute.

3. The method of claim 1 wherein said foamed elastomer has a Shore A hardness in the range of about 10 to 90.

4. The method of claim 1 wherein said body has a wear rate of at least about 0.1 gram per minute per 7 mm length.

5. The method of claim 1 wherein said rotatable body is resistant to fracture at a surface speed greater than about 1550 meters per minute.

6. The method of claim 1 wherein said foamed elastomer is substantially free of particulate matter.

7. The method of claim 1 wherein said foamed elastomer further includes a plasticizer.

8. The method of claim 1 wherein said elastomer is selected from the group consisting of plasticized polyvinyl chloride, alkylenic block copolymer, styrenic block copolymer, thermoplastic polyester, thermoplastic polyurethane, crosslinked natural rubber, ethylene-propylene elastomer, nitrile rubber, styrene/butadiene rubber, thermoplastic polypropylene/-ethylene-propylene copolymer blend, neoprene rubber, thermoplastic polyamide, copolymers thereof, and mixtures thereof.

9. The method of claim 1 wherein said rotatable body produced a peak temperature of less than about 160° C.

10. The method of claim 1 wherein said disc has a thickness of about 1-2 mm.

11. The method of claim 1 wherein said means for rotating said body is a rotary power tool with a rotating shaft.

12. The method of claim 1 wherein said means for rotating said body is capable of rotating said body to provide a peripheral surface with a surface speed in the range of about 450 to 1550 surface meters per minute.

13. A method of removing adhered heat softenable surface coverings from a surface of a heat stable substrate substantially without damage to said substrate, said method comprising the steps of:

(a) providing a rotatable body having a peripheral surface and being rotatable about its axis, said body comprising at least two discs comprising an elastomer, said elastomer being selected so that the body is capable of (1) increasing a temperature of said heat softenable surface covering when said body is rotated in frictional contact therewith to a temperature which diminishes the integrity of said surface covering, (2) forcibly removing said surface covering from said substrate after said increase in temperature, and (3) attriting a portion of said peripheral surface which contacted said surface covering to provide a renewed peripheral surface of said elastomer;

(b) attaching said rotatable body to means for rotating said rotatable body;

(c) rotating said rotatable body to provide a rotating body which rotates about its axis at a surface speed which will cause said surface covering to increase in temperature when contacted by a peripheral surface of said rotating body to a temperature which results in diminished integrity of said surface covering;

(d) contacting a portion of said peripheral surface of said rotating body with said heat softenable surface covering to be removed, causing said surface to increase in temperature and thereafter forcibly removing said portion of said surface covering by said rotating body peripheral surface from said heat stable substrate; and (e) continue rotating said rotating body to cause attrition of said rotating body peripheral surface.

14. The method of claim 13 wherein said surface speed is at least 300 surface meters per minute.

15. The method of claim 13 wherein said elastomer has a Shore A hardness in the range of about 10 to 90.

16. The method of claim 13 wherein said body has a wear rate of about 0.1 gram per minute per 7 mm length.

17. The method of claim 13 wherein said rotatable body is resistant to fracture at a surface speed greater than about 1550 meters per minute.

18. The method of claim 13 wherein said elastomer is substantially free of particulate matter.

19. The method of claim 13 wherein said elastomer is a foam.

20. The method of claim 13 wherein said elastomer further includes a plasticizer.

21. The method of claim 13 wherein said elastomer is selected from the group consisting of plasticized polyvinyl chloride, alkylenic block copolymer styrenic block copolymer, thermoplastic polyester, thermoplastic polyurethane, crosslinked natural rubber, ethylene-propylene elastomer, nitrile rubber, styrene/butadiene rubber, ethylene-propyleneterpolymer rubber, thermoplastic polypropylene/-ethylene-propylene copolymer blend, neoprene rubber, thermoplastic polyamide, copolymers thereof, and mixtures thereof.

22. The method of claim 13 wherein said rotating body produced a peak temperature of less than about 160°.

23. The method of claim 13 wherein said disc has a thickness of about 1-2 mm.

24. The method of claim 13 wherein said means for rotating said body is a rotary power tool with a rotating shaft.

25. The method of claim 13 wherein said means for rotating said body is capable of rotating said body to provide said rotating body peripheral surface with a surface speed in the range of about 450 to 1550 surface meters per minute.

26. The method of claim 13 wherein said discs comprising said elastomer are separated by spacer discs, said spacer discs having an outer diameter less than that of the discs comprising said elastomer.

* * * * *

UNITED STATES PATENT AND TRADEMARK OFFICE

CERTIFICATE OF CORRECTION

PATENT NO. : 5,190,620

DATED : March 2, 1993

INVENTOR(S) : Phillip M. Winter

It is certified that error appears in the above-indentified patent and that said Letters Patent is hereby corrected as shown below:

Col. 12, line 34, "(2/min)" should read --(g/min)--.

Col. 12, line 51, "and" should read --said--.

Col. 12, line 58, "therein" should read --therewith--.

Col. 12, line 59, "covering (2)" should read --covering, (2)--.

Col. 13, line 35, "polypropylene/-ethylene-propylene" should read --polypropylene/ethylene-propylene--.

Col. 14, line 44, "polypropylene/-ethylene-propylene" should read --polypropylene/ethylene-propylene--.

Col. 14, line 49, "160°." should read --160°C.--

Signed and Sealed this

Fourth Day of October, 1994

Attest:

BRUCE LEHMAN

Attesting Officer

Commissioner of Patents and Trademarks